United States Patent [19]

Lesniak et al.

[11] 3,809,377
[45] May 7, 1974

[54] ROTARY VESSEL FURNACE

[76] Inventors: Chryzant Lesniak, ul. 18-ego Sierpnia Blok C, m. 9; Edmunt Bryjak, 6 ul. Harcersta 2, both of Katowice, Poland

[22] Filed: Dec. 22, 1972

[21] Appl. No.: 317,698

[52] U.S. Cl. ................................. 266/18, 432/118
[51] Int. Cl. ............................................. C21d 1/12
[58] Field of Search.................. 266/15, 16, 18, 5 R; 432/113, 114, 116, 117, 118

[56] References Cited
UNITED STATES PATENTS
3,272,489   9/1966   Heyer et al. ...................... 266/4 R Primary Examiner—Gerald A. Dost
Attorney, Agent, or Firm—Waters, Roditi, Schwartz & Nissen

[57] ABSTRACT

Rotary vessel furnace for the chemical heat treatment of metals and alloys, including a rotatable cylindrical retort adapted to receive said metals or alloys and a gaseous material-treating medium, said retort having a coil extending along and in proximity to the inner circumferential surface thereof so as to prevent contact between the retort wall and the material being chemically heat treated.

5 Claims, 2 Drawing Figures

ROTARY VESSEL FURNACE

FIELD OF THE INVENTION

The present invention relates to a rotary vessel furnace designed for the chemical heat treatment of metals and alloys in a gaseous medium.

DISCUSSION OF THE PRIOR ART

Rotary vessel furnaces utilized in the chemical heat treatment of metals and alloys in a gaseous medium are generally known, the vessel or retort in these furnaces being made in the form of a tube facilitating the through-flow of a stream of the treating gas, and with both ends of the tube having closures for sealing the tube.

The metal or alloy treating substance which is precipitated or emitted from the stream of gas, during operation of the furnace, usually deposits itself on the surfaces of the metal or alloy material being treated, as well as on the interior walls of the vessel or retort, so as to eventually form thus producing a loosely deposited surface layer which screens the material being treated from contact by the treating medium. This, in effect, prevents the uniform and required treatment of the surfaces of the metal or alloy material. Consequently, presently employed rotary vessel furnaces are basically designed for intermittent or batch operation, and after the completion of each material treatment cycle, a considerably amount of time is wasted in the discharging and recharging of the furnace so as to render the latter cumbersome and uneconomical.

Furthermore, in the case of the chemical heat treatment of the metals or alloys by means of a composite gaseous substance, the substance which is precipitated or emitted from the stream of gas treating medium generally has a varying chemical constitution or make-up, thereby frequently causing the metal or alloy material being treated to be unevenly coated with a layer or deposit which may contain chemical elements detrimental to the material treating efficiency or properties of this layer.

SUMMARY OF THE INVENTION

It is accordingly, an object of the present invention to obviate the drawbacks encountered in the prior art by providing an improved and novel rotary vessel furnace which enables the uniform chemical heat treatment of all surfaces of metal or alloy material and workpieces, and coating the surfaces of the material being treated with a layer having a precisely defined chemical constituency.

A more specific object of the present invention lies in installing a coil within the vessel or retort so as to extend in proximity to its walls, and introducing pipes for supplying the vessel with a stream of the gaseous treating medium and for then discharging the gaseous medium from the vessel. The coil within the vessel maintains the material being treated by the gaseous medium in a separated or spaced relationship with the deposits precipitated from the gaseous material accummulating in the vessel, so as to thereby enable the substance which is precipitated from or emitted by the stream of gaseous medium to uniformly settle on the surfaces of the metal or alloy material being treated. Additionally, the pipes for supplying the vessel with the stream of gaseous treating medium and for discharging this medium from the vessel are positioned so as to restrict the process of chemical heat treatment of the material to the region or portion of the furnace in which the temperature conditions are predetermined, to thereby precipitate a composite substance of a precisely defined chemical constituency from the gaseous material treating medium.

BRIEF DESCRIPTION OF THE DRAWING

Reference is now had to a detailed description of an exemplary embodiment of a rotary vessel furnace according to the present invention utilized, for example, in the chemical heat treatment of plates for cutting tools, taken in conjunction with the accompanying drawing, in which.

DETAILED DESCRIPTION

Figure 1:
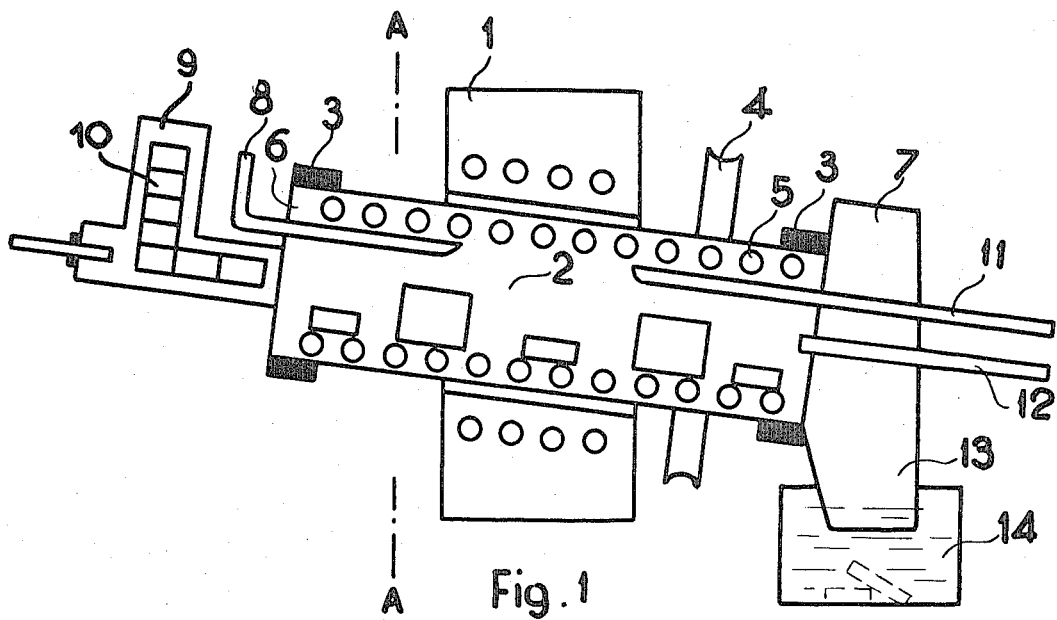
FIG. 1 is a diagramatic vertical sectional view of a rotary vessel furnace according to the present invention.
Figure 2:
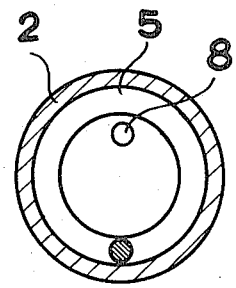
FIG. 2 is a sectional view along line A—A in FIG. 1.

Referring now in detail to the drawing, a furnace 1 includes an inclined cylindrical retort 2 rotatably supported by bearings 3. A wheel 4, as for example a gear or pulley, is fastened to the outer circumferential surface of the retort 2, and with the wheel adapted to be engaged by a driving system (not shown) for imparting rotation thereto. The ends of the cylindrical retort 2 are closed by means of stationary covers 6 and 7. Located within the cylindrical retort 2 and extending therealong in proximity to its circumferential inner wall is a coil 5. Extending through apertures in cover 6 is a pipe 8 and a feeder arrangement 9 for a charge 10. The charge 10 consists of the material to be treated, and may be constituted of suitable workpieces, such as plates or components for tool cutters or the like. The charge or workpieces 10 are generally formed of metal or metallic alloys requiring chemical heat surface treatments. Extending through cover 7 are two pipes 11 and 12. An apertured bottom portion 13 of cover 7 is submerged in a tank 14 containing a quantity of a quenching or cooling liquid.

The pipe 11 is connected with a source for supplying a stream of material treating gas, while the pipe 12 is connected with a source for supplying a stream of gas having a generally inert or non-reactive nature with respect to the material being treated. Pipe 8 is connected with a duct through which the gaseous medium is discharged from cylindrical retort 2, and through which the feeder arrangement 9 is charged with charge 10.

The operation of the rotary vessel furnace is as follows:

After the furnace 1 and rotation of the retort drive wheel 4 are started the workpieces or material 10 to be treated is fed by the feeder arrangement 9 into the retort 2, and moves and tumbles through retort 2 toward the lower inclined end thereof along the inner diameter surface of coil 5. During that time the material 10 is subjected to chemical heat treatment under the effect of the gaseous treating medium in the region defined by the position of the adjacent ends of pipes 11 and 8 in retort 2, and then the treated material falls into the liquid in tank 14. The stream of inert or non-reactive gas flowing into retort 2 through pipe 12 protects the material 10 being treated against premature contact with the gaseous treating substance before reaching the zone in retort 2 in which the treating medium is fed to the retort 2 through pipe 11.

Deposits or precipitates from the gaseous medium in the retort 2 formed during material treatment, drift between the retort surface and the outer diameter of coil 5 and then drops into tank 14 together with the treated material 10 without coming into physical contact with the material.

While the furnace operates, the supply of charge material 10 is constantly replenished in feeder arrangement 9, and the finished treated material, as well as the deposit, is removed from tank 14.

The inventive furnace permits for metals and alloys of practically all kinds to be subjected to a chemical heat treatment in a gaseous material treating medium. The furnace is particularly suitable for the continuous chemical heat treatment of materials when a uniform treatment of all of the surfaces of the materials is required, and when there is a demand for these surfaces to be coated with a uniform and a precisely constituted chemical substance layer, for instance, when carbide blanks are to be coated with a TiC layer which is neither too low nor excessive carbon content.

While there has been shown what is considered to be the preferred embodiment of the invention, it will be obvious that modifications may be made which come within the scope of the disclosure of the specification.

What we claim is:

1. A rotary vessel furnace for the chemical heat treatment of metals and metal alloys or the like in a gaseous medium, a furnace; a rotatable cylindrical retort extending through said furnace; coil means extending along and proximate to the circumferential inner wall surface of said retort; means for conveying material to be treated into said retort; conduit means for feeding a stream of a gaseous material-treating medium into said retort; and conduit means for discharging said gaseous medium from said retort, said coils being adapted to maintain said material and the inner circumferential surface of said retort in spaced relationship during heat treatment of said material in said furnace.

2. A furnace as claimed in claim 1, said cylindrical retort extending at an incline relative to a horizontal axis, said material adapted to be conveyed into said retort at the higher located end thereof and discharged from the lower end of said retort.

3. A furnace as claimed in claim 2, comprising a liquid-containing tank positioned below and in communication with the lower end of said retort; said tank being adapted to receive treated material from said retort.

4. A furnace as claimed in claim 1, said gaseous material-treating medium feeding and discharging conduits extending into said cylindrical retort from the opposite ends thereof, and the ends of said conduits being spaced relative to said other so as to define a predetermined zone within said retort for treatment of said material.

5. A furnace as claimed in claim 1, comprising conduit means for feeding a gaseous non-reactive medium into said cylindrical retort so as to impart a protective coating to said material prior to chemical heat treatment thereof in said retort.

* * * * *